M. H. HULINGS, DEC'D.
S. P. HULINGS, ADMINISTRATRIX.
PACKING FOR ROTARY ENGINES.
APPLICATION FILED MAY 25, 1908.

912,963.

Patented Feb. 16, 1909.

WITNESSES:
Robt F. Dilworth
M. Chillum

INVENTOR
Marcus H. Hulings
BY Audlor Swingsts
HIS ATTORNEY

UNITED STATES PATENT OFFICE.

MARCUS H. HULINGS, OF ALLEGHENY, PENNSYLVANIA; SALLIE PAGE HULINGS, ADMINISTRATRIX OF SAID MARCUS H. HULINGS, DECEASED, ASSIGNOR TO WILLIS J. HULINGS.

PACKING FOR ROTARY ENGINES.

No. 912,963.        Specification of Letters Patent.        Patented Feb. 16, 1909.

Original application filed December 31, 1907, Serial No. 408,762. Divided and this application filed May 25, 1908. Serial No. 434,777.

*To all whom it may concern:*

Be it known that I, MARCUS H. HULINGS, residing at Allegheny, in the county of Allegheny and State of Pennsylvania, have invented certain new and useful Improvements in Packings for Rotary Engines, of which the following is a specification.

My invention relates to packing and particularly to packings adapted to rotary engines and has for its object to provide a means of packing gas engines of the rotary type and similar machines where a packing is required which will provide a tight and uniform joint between the fixed and rotary members and especially adapted to provide an even frictional contact at all points around the periphery of the rotating members.

A further object is to provide a packing which will be readily lubricated.

Another object is to provide a packing of this description which will withstand a high degree of heat.

Figure 1:
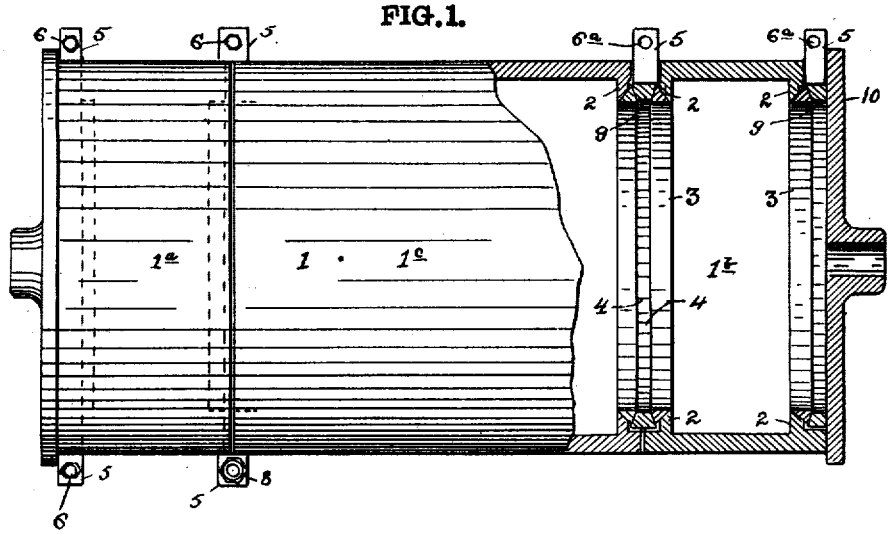
Figure 2:
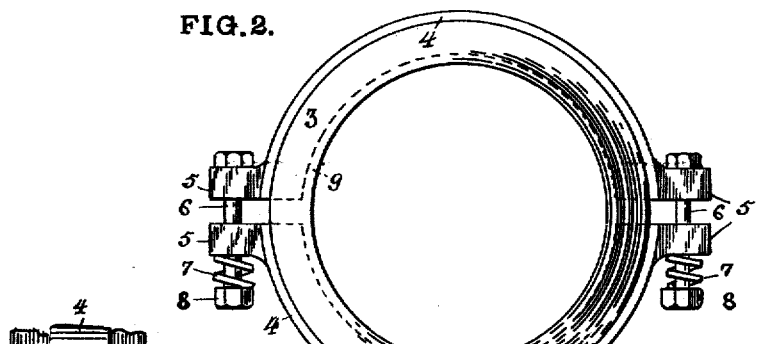
Figure 4:
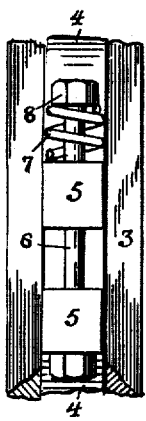
Figure 3:
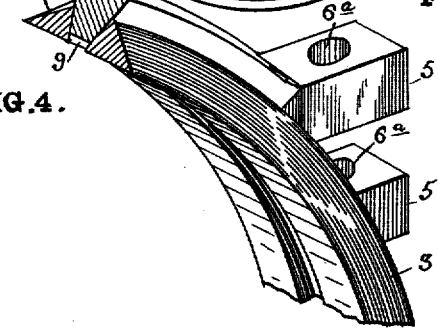

In the drawings which form a part of this specification Figure 1 represents the casing of a rotary engine, a portion of the casing being broken away to expose the lower half of the interior thereof and is divided into three sections to resemble the casing of a rotary gas engine for which I have made application for Letters Patent, Serial Number 408,762, filed December 31st, 1907, and of which this application is a division. Fig. 2 is a side view of my improved packing and shows the relative position of the tightening means therefor. Fig. 3 is a view in perspective of a fragment of the packings and a portion of the wedge-shaped tightening ring and lugs. Fig. 4 is an end view of a portion of the packing rings and the tightening rings at the lugs.

Referring again to the drawings for a detailed description of my invention 1 represents a rotary engine casing composed of the sections 1ᵃ, 1ᵇ and 1ᶜ joined together to form with a rotatable cylinder a rotary gas engine, the rotatable member being removed for the sake of clearness. Flanges 2—2 are provided at the ends of said sections having a beveled edge so that the adjacent flanges or a flange and end plate form a groove or recess around the inner circumference of the casing to receive the packing.

3 represents packing rings of triangular cross section and may be either endless or if desired may be split to allow for expansion. It will be seen that the inner face of these packing rings presents an even surface to the periphery of the rotatable cylinder which is designed to revolve therein. The remaining two sides of the packing rings, having in mind the triangular cross section of the packing ring at any point, taper to an apex. Tightening rings composed preferably of two semi-circular halves 4—4 are provided with lugs 5—5 having bolt holes 6ᵃ—6ᵃ therein. These tightening rings are wedge shaped in cross section and are adapted to be inserted in the groove formed by the flange 2 and the adjacent casing or by adjacent flanges 2—2. The lugs 5—5 extend through and out of the casing and are provided with bolts 6—6 connecting complementary pairs of lugs. A slight space is allowed between adjacent lugs for the purpose of drawing up the semi-circular halves of the tightening ring and spiral springs 7 are placed on the bolts 6 and held by the nuts 8. It will be seen that as the two halves of the tightening ring 4 are drawn together by means of the bolts 6 and the tension of the springs 7 the wedge shaped cross section of these tightening rings tends to wedge out the packing rings 3 uniformly throughout their entire length and force said packing rings into tight contact with the adjacent revoluble member.

At the space between the lugs where the semi-circular halves of the tightening rings approach each other lubricant may be injected if desired as will be apparent. It will be seen from the drawings that the tightening rings do not extend entirely to the inner face of the packing rings and this channel or groove 9 so formed may be filled with lubricant.

The purpose of the spring 7 on the bolts 6 is to allow for resiliency in the packing. The nuts 8 being drawn up to the desired tension and the springs compensating for any variation, such as expansion, contraction and vibration.

In Fig. 1 of the drawing the adaptation to use of my invention is shown both where the packings and the tightening rings are disposed between adjacent flanges of two connected sections and also between the flange of a section and the adjacent casing or end plate 10 of the engine.

While I have described this novel packing as applied to rotary gas engines it will be evident to those skilled in the art that there are many uses for same.

Having thus fully described my invention I claim as new and desire to protect by Letters Patent of the United States:

1. In a packing for rotating members, the combination with a groove having a tapered cross section, of a packing ring triangular in cross section, a wedge-shaped tightening ring provided with lugs, and means for drawing the lug ends of said ring together to wedge out the packing ring, substantially as described.

2. In a packing for rotating members, the combination of a beveled edge on one of the parts, a packing triangular in cross section arranged against said beveled edge, a wedge shaped tightening ring coöperatingly arranged with relation to said packing, and means contracting said tightening ring.

3. In a packing for rotary engines, the combination with a groove having beveled edges, of packing rings triangular in cross section, a tightening ring comprising semi-circular halves of wedge-shaped cross-section and provided with end lugs, and resilient means for drawing the lug ends of said ring together to wedge out the packing rings and allow for varying pressure against said packing, substantially as described.

In testimony whereof I have affixed my signature in presence of two witnesses.

MARCUS H. HULINGS.

Witnesses:
A. H. KAUFMAN,
M. CHILLEEN.